United States Patent [19]

Ammons

[11] 4,103,070

[45] Jul. 25, 1978

[54] SAFETY GLASS LAMINATES WITH ALIPHATIC/CYCLOALIPHATIC POLYCARBONATE URETHANES

[75] Inventor: Vernon G. Ammons, Glenshaw, Pa.

[73] Assignee: PPG Industries, Inc., Pittsburgh, Pa.

[21] Appl. No.: 767,936

[22] Filed: Feb. 11, 1977

Related U.S. Application Data

[62] Division of Ser. No. 681,013, Apr. 28, 1976, Pat. No. 4,024,113.

[51] Int. Cl.$^2$ ............... B32B 17/10; B32B 27/36; B32B 27/40
[52] U.S. Cl. ............................. 428/412; 428/425
[58] Field of Search ............ 428/412, 425, 426, 430

[56] References Cited

U.S. PATENT DOCUMENTS

| | | | |
|---|---|---|---|
| 3,117,019 | 1/1964 | Cohnen et al. | 428/412 |
| 3,388,032 | 6/1968 | Saunders | 428/425 |
| 3,764,457 | 10/1973 | Chang et al. | 428/412 |
| 4,024,113 | 5/1977 | Ammons | 428/425 |

*Primary Examiner*—J.C. Cannon
*Attorney, Agent, or Firm*—Donna L. Seidel

[57] ABSTRACT

Energy-absorbing laminates for use as automobile windshields or other safety glass applications comprising a polycarbonate urethane and a sheet of glass are disclosed. The polyurethane is formed from a cycloaliphatic diisocyanate, a compound containing at least two active hydrogens per molecule and having a molecular weight below 250, and a special polycarbonate diol synthesized from a mixture of linear aliphatic and cycloaliphatic diols.

3 Claims, No Drawings

SAFETY GLASS LAMINATES WITH ALIPHATIC/CYCLOALIPHATIC POLYCARBONATE URETHANES

This is a division of application Ser. No. 681,013, filed Apr. 28, 1976, now U.S. Pat. No. 4,024,113.

BACKGROUND OF THE INVENTION

1. Field of the Invention

This invention relates to laminated glass articles, more particularly, to bilayer laminated safety glass comprising a polycarbonate urethane adhered to a sheet of glass.

2. Brief Description of the Prior Art

Safety glass is a well-known term for a glass sandwich composed of a plastic interlayer bonding together two glass plates or sheets so that the breaking of the glass results in minimum dispersion of fragments of broken glass. Laminated safety glass is widely used in automobiles and must possess a number of properties including: (1) high impact energy absorption to minimize concussive injury; (2) shear and tear strength sufficient to prevent rupture of the interlayer by broken glass; (3) sufficient adhesion between the interlayer and the glass to prevent dispersion of broken glass to minimize lacerative injury; and (4) good optical quality.

One difficulty encountered in present windshields is that upon breaking, sharp glass edges develop which can result in severe laceration. Bilayer windshields comprising an outer ply of glass and an inner ply of plastic have been suggested for minimizing lacerative injury. However, since the plastic layer will be exposed to the atmosphere, it must have, in addition to the properties enumerated above, excellent weathering properties, such as ultraviolet light and hydrolytic stability, in order to retain its desirable mechanical properties and optical quality.

Since about 1930, plasticized polyvinyl butyral has been the most widely used interlayer material. However, it has been used almost exclusively in conventional trilayer windshields. Polyvinyl butyral is particularly susceptible to moisture and is not amenable to fabrication in the form of a bilayer windshield in which one surface of the polyvinyl butyral is exposed to the atmosphere.

There has been a trend in recent years to provide a substitute plastic interlayers material for polyvinyl butyral. U.S. Pat. Nos. 3,388,032; 3,522,142; and 3,620,950 and Belgian Patent No. 785,125 all disclose various polyurethane materials for use in fabrication motor vehicle safety glass. The polyurethane materials, in general, offer improved physical properties over the polyvinyl butyral in that they have better impact resistance at high temperatures and are not nearly so moisture sensitive. However, a disadvantage associated with the use of polyurethane materials is that many polyurethane formulations "bloom" that is, develop a hazy surface upon exposure to the atmosphere. This "bloom" reduces the optical quality of such materials and discourages their employment in bilayer configurations.

U.S. Pat. No. 3,764,457 entitled "Transparent Impact-Resistant Poly(Carbonate-Urethane) Laminate" to Chang et al. and assigned to PPG Industries, Inc., the assignee of the instant invention, discloses that polycarbonate urethanes, particularly polyoxyalkylenecarbonate urethanes, are useful as interlayers for safety glass windshields. However, polyoxyalkylenecarbonate glycols are very sensitive to ultraviolet light, which curtails their use in bilayer laminates.

SUMMARY OF THE INVENTION

It has now been discovered that bilayer laminates of glass and particular urethane polymers can be employed to provide safety glass which is impact-resistant over a wide temperature range, minimizing lacerative injury, and is superior to safety glass using polyvinyl butyral interlayer commercially employed at the present time.

More particularly, the urethane polymer is formed from:

(a) a special polycarbonate diol;
(b) a cycloaliphatic diisocyanate; and optionally
(c) a compound containing at least two active hydrogens per molecule reactive with isocyanate groups and having a molecular weight of less than 250.

The polycarbonate urethanes disclosed herein, unlike analogous polymers prepared from polyoxyalkylenecarbonate segments, have excellent weathering resistance as measured by ultraviolet light stability and are hydrolytically stable, making them particularly useful in bilayer laminates.

The special polycarbonate diols of the present invention are prepared from mixtures of linear aliphatic and cycloaliphatic diols. The cycloaliphatic diol contributes cycloaliphatic structural units to the final polyurethane resulting in a high degree of polymer backbone chain irregularity thus avoiding the problem of crystallinity and allowing the production of desirable polyurethanes with a lower urethane content than was considered possible in the prior art. Moreover, special polycarbonate diols may be prepared which, when formulated into the final polyurethane, inhibit the tendency of the polyurethane to bloom.

DETAILED DESCRIPTION

Polycarbonate urethanes contemplated herein are prepared from polycarbonate diols, cycloaliphatic diisocyanates, and optionally a compound containing at least two active hydrogens per molecule reactive with the isocyanate groups and having a molecular weight less than 250.

Polycarbonate diols of the present invention are prepared from a mixture of linear aliphatic diol and cycloaliphatic diol. At least about 10 mole percent of the cycloaliphatic diol is required to yield a non-crystalline polyurethane. Use of as much as 100 percent cycloaliphatic diol will yield a non-crystalline polyurethane; however, at least about 30 mole percent linear aliphatic diol is required in order to yield a polyurethane having the desired energy-absorbing properties. The preferred mixture contains from about 50 to about 80 mole percent linear aliphatic diol, and from about 20 to about 50 mole percent cycloaliphatic diol. The preferred ratio of linear to cycloaliphatic diols results in a polycarbonate diol which when incorporated into a polyurethane structure prevents "bloom". The most preferred mixture of linear and cycloaliphatic diols is from about 70 to about 80 mole percent 1,6 hexanediol and from about 30 to about 20 mole percent 1,4 cyclohexane dimethanol.

The polycarbonate diols useful in the practice of this invention have average molecular weights between 500 and 5000, preferably between 550 and 2500, and hydroxyl numbers between 224 and 22, preferably between 204 and 45. The molecular weights can be determined by hydroxyl end group analysis and by the formula:

Average Molecular Weight =
$$\frac{\text{(functionality of polyalkylenecarbonate diol) (56.1) (100)}}{\text{hydroxyl number of polyalkylenecarbonate diol}}$$

The hydroxyl number can be determined by adding pyridine and acetic anhydride to the polycarbonate diol and titrating the acetic acid formed with KOH as determined in *Ind. Eng. Chem. Anal.*, ed. 16, 541-49 and *Ind. Eng. Chem. Anal.*, ed. 17, 394 (1945). The hydroxyl number is defined as the milligrams of KOH per gram of polyalkylenecarbonate diol.

The special polycarbonate diols of the present invention may be prepared by known methods such as by the reaction of a mixture of linear aliphatic and cycloaliphatic diols with a mixture of their respective bischloroformate derivatives, or by reaction of a mixture of linear aliphatic and cycloaliphatic diols with phosgene. The special polycarbonate diols of the present invention can also be readily synthesized according to the following reaction scheme:

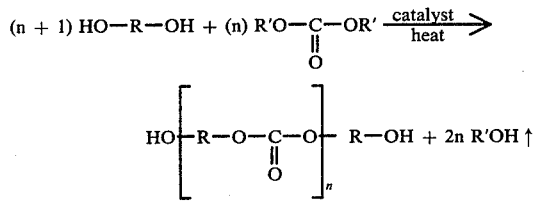

where n 4 to 46, R is a mixture of linear aliphatic groups containing from 4 to about 10 carbon atoms and cycloaliphatic groups containing about 6 to 10 carbon atoms and R' is a lower alkyl group containing 1 to 4 carbon atoms or an aryl group.

The reaction takes place under reflux conditions with the continuous elimination of R'OH. During the last stages of the reaction, the residual R'OH is removed by vacuum stripping. As shown in the above reaction scheme, the mixture of hydroxy-terminated alkylene diols can be reacted with dialkyl carbonates such as methyl, ethyl, n-propyl or n-butyl carbonate or diaryl carbonates such as diphenylcarbonate or dinaphthylcarbonate. However, when dialkyl carbonates are used, classical alkali metal-alkoxide type catalysts should be avoided because of adverse effects when reacting the polycarbonate to form a urethane polymer. Therefore, a preferred method for making this polycarbonate diol is by transesterification of a mixture of linear and cycloaliphatic diols with diethylcarbonate using tetrabutyl titanate as the catalyst, as disclosed in U.S. application Ser. No. 681,012, entitled "Catalyst for Making Polycarbonate Diols for Use in Polycarbonate Urethanes".

The organic diisocyanate component is preferably an aliphatic diisocyanate, particularly a cycloaliphatic diisocyanate. The cycloaliphatic diisocyanates are not adversely affected by ultraviolet light and yield polyurethanes which have high impact energy absorption levels which make them desirable for bilayer safety glass applications. In addition, polyurethanes prepared with cycloaliphatic diisocyanates are not adversely affected by conventional processing temperatures. Polyurethanes made with analogous aromatic diisocyanates such as toluene diisocyanate and methylene diphenyl diisocyanate do not normally have as good impact energy absorption levels, are subject to ultraviolet light deterioration and also are not as thermally stable as comparable polyurethanes made with cycloaliphatic diisocyanates.

In addition to the preferred 4,4'-methylene-bis-(cyclohexyl isocyanate), other useful dinuclear cyclic aliphatic diisocyanates are those which are formed through an alkylene group of from 1 to 3 carbon atoms, inclusive, and which can be substituted with nitro, chlorine, alkyl, alkoxy and other groups which are not reactive with hydroxyl groups (or active hydrogens) providing they are not positioned so as to render the isocyanate group unreactive. Another preferred dinuclear cyclic aliphatic diisocyanate is 4,4'-isopropylidene-bis-(cyclohexyl isocyanate). A preferred mononuclear cyclic aliphatic diisocyanate is 1,4-cyclohexyl diisocyanate. Also, hydrogenated aromatic diisocyanates such as hydrogenated toluene diisocyanate may be employed. Dinuclear diisocyanates in which one of the rings is saturated and the other unsaturated which are prepared by partially hydrogenating aromatic diisocyanates such as diphenyl methane diisocyanates, diphenyl isopropylidene diisocyanate and diphenylene diisocyanate may also be employed. Mixtures of cycloaliphatic diisocyanates with straight chain aliphatic diisocyanates and/or aromatic diisocyanates can also be employed. An example is 4,4'-methylene-bis-(cyclohexyl isocyanate) with commercial isomer mixtures of toluene diisocyanate or meta-phenylene diisocyanate. Thioisocyanates corresponding to the above diisocyanates can be employed as well as mixed compounds containing both an isocyanate and a thioisocyanate group. Diisocyanates are used herein including thioisocyanates and compounds containing both an isocyanate and a thioisocyanate group.

The polyurethanes can optionally be chain extended, depending upon the molecular weight of the polycarbonate diol, with a compound having two active hydrogens per molecule as determined by the Zerewitinoff test as described by Kohler in *Journal of the American Chemical Society*, 49 3181 (1927). The chain extenders should have molecular weights of less than 250 are are preferably aliphatic diols containing from 2 to 15 carbon atoms, such as ethylene glycol, 1,3-propanediol, 1,4-butanediol and 1,6-hexanediol, with 1,4-butanediol being the most preferred. Amino alcohols and diamines can also be employed. Examples include monoethanolamine and 1,2-ethylenediamine.

The polyurethane can also be cured with a compound having more than two active hydrogens per molecule. The resulting polyurethane will have thermosetting properties. Representative curing agents are polyols having at least three hydroxyl groups; such as trimethylol propane, trimethylol heptane, pentaerythritol and castor oil. Also suitable are mixed curing agents, such as polyols having three hydroxyl groups in conjunction with a low molecular weight diol such as ethylene glycol and 1,4-butanediol. The polyols can also be mixed with polyamines having two or more reactive amine groups.

Proportions of the ingredients employed will depend upon the particular ingredients employed and their molecular weight. In any event, the total number of labile or active hydrogen atoms is approximately equivalent to the number of isocyanate groups. The NCO to active or labile hydrogen ratio is generally from between 0.9-1.1 to 1. The mole ratio of diisocyanate to polycarbonate diol to chain extender should broadly fall within the following ranges:

| Component | Mole Ratio |
| --- | --- |
| cycloaliphatic diisocyanate | 1.0 to 9.4 |
| polycarbonate diol | 1.0 |
| chain extender | 0.0 to 8.4 |

The polyurethanes should be chain extended when the average molecular weight of the polycarbonate diol is above about 700 (especially between 1000–5000). Polyurethanes prepared with these higher molecular weight diols without the use of a chain extender have a tendency to crystallize and become opaque, making the urethanes unsuitable for motor vehicle glazing applications. Chain extending these polymers with a low molecular weight compound containing active hydrogens, such as 1,4-butanediol, increases the urethane content of the polymer making it more random, thereby reducing the tendency of the polymer to crystallize. The use of the cyclcoaliphatic-containing polycarbonate diol reduces the urethane linkage content required to avoid crystallinity.

With lower number average molecular weight polycarbonate diols, that is, those having molecular weight below 700, particularly in the range of 500 to 600, chain extension is not necessary and not recommended. Polyurethanes prepared with these lower molecular weight polycarbonate diols have sufficient randomness associated with polymer to be amorphous and optically clear. Chain extending these polymers with a low molecular weight active hydrogen compound would introduce too high a urethane content into the polymer making it too stiff and rigid for automotive glazing applications. On the other hand, with high molecular weight polycarbonate diols having a molecular weight greater than 700 and especially between about 1000 and 5000, chain extending with a material such as 1,4 butanediol is recommended.

The relative proportions of polyalkylenecarbonate diol and chain extender which should be employed are determined by the desired mechanical properties and the molecular weight of the polycarbonate diol. For example, when the average molecular weight of the polyalkylenecarbonate diol is above 700, and especially between 1000 and 5000, the mole ratio of chain extender, such as 1,4-butanediol, to polyalkylenecarbonate diol should be about 1.25 – 5.70:1.00. When the polycarbonate diol is of lower average molecular weight, i.e. below 700 and particularly between 500 and 600, the mol ratio of lower molecular weight active hydrogen-containing compound, such as 1,4 butanediol, to polycarbonate diol is much less, about 0.00 to 0.40:1.00.

The following is a list of mole ratio ranges of the preferred polycarbonate urethanes useful in the practice of this invention.

| Component | Mole Ratio |
| --- | --- |
| cycloaliphatic diisocyanate | 1.000 |
| polyalkylenecarbonate diol, average molecular weight below 700, particularly between 500 to 600 | 1.000 |
| cycloaliphatic diisocyanate | 2.40 to 4.60 |
| polyalkylenecarbonate diol, average molecular weight greater than 700, particularly between 1000 to 3000 | 1.000 |
| chain extender | 1.40 to 3.60 |

The polycarbonate urethanes for the laminates of the invention can be prepared in several ways, namely, by the "one shot" or bulk polymerization method and by the prepolymer method. In the "one shot" or bulk polymerization method, all the ingredients, that is, isocyanate, polycarbonate diol and chain extender are mixed simultaneously. This method is generally satisfactory when all active hydrogens react at about the same rate such as when all contain hydroxyl groups as the only reactive sites. The urethane reaction is preferably conducted under anhydrous conditions with dry reactants such as in a nitrogen atmosphere of atmospheric pressure and at a temperature between 100 and about 140° C. The polycarbonates are dried before reaction, usually to a moisture content of between about 0.01 to 0.05 percent. To obtain the randomness desired and a clear leathery polymer, the active hydrogen compound, for example, anhydrous 1,4-butanediol (containing a maximum of 0.04 percent water) is preferably added to the polycarbonate under a nitrogen atmosphere to exclude the moisture and the temperature maintained sufficiently high so that there is no phase separation and a homogeneous mixture is obtained. The diisocyanate, for example, 4,4'-methylene-bis-(cyclohexyl isocyanate), is preferably added rapidly and the temperature of the mixture maintained above about 75° C. so that there is no phase separation and the mixture remains homogeneous. The mixture is then preferably vigorously agitated at a temperature of at least about 75° C. and degassed for a period of at least about 3 minutes during which time the pressure is reduced from atmospheric to about 3 millimeters of mercury. The reduction in pressure facilitates the removal of the dissolved gases such as nitrogen and carbon dioxide and then the ingredients are preferably reacted at a temperature of between about 110° and 140° C. in the presence of a catalyst and the reaction continued for at least about 6 hours until there are substantially no isocyanate groups. The isocyanate content of the polymer will be less than 0.6 percent by weight isocyanate groups and preferably less than 0.3 percent by weight. In lieu of a catalyst, the reaction can be conducted for at least about 24 hours, preferably under a nitrogen atmosphere. The resultant polymer is then preferably cut while warm, granulated, extruded and/or milled and calendered to sheets and assembled into laminates and aged for several days or a week at room temperature.

Polymers having the desired random distribution can also be prepared by the prepolymer method, when the polycarbonate is treated with an excess of that required to end cap it or more than 2 moles of diisocyanate per mole of polycarbonate. Generally about 3 moles of diisocyanate per mole of polycarbonate are required, more preferably, 4 moles or more. Then the active hydrogen compound can be reacted with the prepolymer. When the prepolymer method is employed, the prepolymer and chain extender are preferably heated so as to reduce the prepolymer viscosity to $\approx 200$ or at most a few thousand centipoises so as to aid in mixing. The mixing of the prepolymer with chain extender is a critical step and the agitation should be excellent. As in the bulk polymerization, reaction should be conducted under anhydrous conditions with dry reactants.

An important criterion of the polycarbonate urethane is that it should be transparent at least when in the form of a thin sheet as it is used in safety glass. It has been discovered that appropriate clear or haze-free films are provided when the urethane reactants are made homogeneous and reacted at a temperature of about 110° to about 140° C. or above. In many cases, however, additional steps are necessary in order to obtain haze-free clear polymers. For example, some compositions made from high molecular weight polycarbonates such as 3000 molecular weight are translucent, unless the reaction rates of the reactants are controlled to obtain a random distribution such as by the use of a catalyst or by conducting the reaction at higher temperatures.

It is believed that the unusual energy absorption properties and transparency are not only dependent upon the urethane ingredients and proportions but on the method of preparation. More particularly, it is believed that the presence of polyurethane regular block segments adversely bears upon the polyurethane transparency and energy absorption properties and consequently it is believed that a random polymer is necessary for optimum results. Consequently, whether the urethane contains random or regular block segments depends upon the particular reagents and their relative reactivity as well as the conditions of reaction. Generally speaking, the diisocyanate will be more reactive with the low molecular weight active hydrogen compound, for example, 1,4-butanediol, than the hydroxy-terminated polycarbonate and, hence, care is required to inhibit the preferential reaction between the butanediol and the diisocyanate such as by rapidly adding the diisocyanate to an intimate mixture of the butanediol and polycarbonate with vigorous agitation, preferably at a temperature of at least about 75° C. when no catalyst is employed, and then maintained at temperature of reaction at least about 110° C. after the exotherm has subsided. When a catalyst is employed, the mixing temperature will generally be lower such as about 60° C. so that the exotherm does not carry the temperature of the mixture substantially above the reaction temperature desired. Inasmuch as the polyurethanes are thermally stable, however, reaction temperatures can reach as high as 200° and as low as 60° C. A preferred temperature range is between about 75° and about 130° C. when a catalyst is employed and more preferably between about 80° and 100° C. When no catalyst is employed, the reaction temperature is preferably between about 130° and 150° C.

It is also important to rapidly attain reaction temperatures after a homogeneous mixture is obtained, when a catalyst is not employed, so that the polymer does not become hazy. For example, it has been found that some mixtures become hazy in less than one-half hour at 50° C. Thus, it is important either to use a catalyst or, by introducing the reactants at a reaction temperature such as by the use of a high-speed shear mixing head (see, for example, U.S. Reissue Pat. No. 24,514 to Hoppe et al.), to rapidly reach the reaction temperature such as above about 130° C., so that the polymer does not become hazy.

Although not required for all reactions, catalysts, for example, tin catalysts such as dibutyl tin dilaurate, stannous octoate and butyl stannoic acid, are preferably employed. Catalyst concentrations range from 0.0057 to 0.015 percent by weight based on total formula weight. Optionally, ultraviolet light absorbers such as 2,4-dihydroxy benzophenone can be employed. Thermal stabilizers such as dilauryl thiodipropionate are also optional. Concentrations of these optional ingredients range from 0.10 to 0.20 percent by weight based on total formula weight.

After reaction is substantially complete, the polymer is preferably transferred directly to an extruder and extruded and/or milled and calendered to the deisred thickness or the partially polymerized material can be further polymerized in the forming equipment.

Conventional rubber mills and extruders can be employed to form the polymer into sheet form. The material is then preferably sandwiched between a non-adhered protecting material such as polyethylene to exclude dust and preferably sealed in a container to exclude moisture. It may be desirable to coat the polymer with a powder such as sodium bicarbonate in order to prevent adjacent sheets from adhering to each other. Before use in a laminate, it is desirable to control the moisture content in a polymer such as by drying in an oven at a temperature of between about room temperature and about 120° F. (about 49° C.) for from a few hours up to about 3 days or more. Before lamination, the powder, if employed, can be removed in a water bath and the sheet dried. The polyurethane can then be assembled with other materials to form the desired laminate.

Since the polycarbonate urethanes of the invention are to be used in glass laminates, an adhesion control agent to maintain the desired level of adhesion of the polyurethane to glass may be necessary. Suitable adhesion promoters are alkoxy silanes, such as glycidyl-oxy-propyltrimethoxy silane sold by Dow Corning Company under the tradename Z-6040. The adhesion control agent is preferably incorporated into the urethane reactants in concentrations of about 0.10 to 0.20 percent by weight based on total formula weight. In some cases an adhesion control agent or inhibitor may be necessary such as an alkyl acid phosphate disclosed in Canadian Pat. No. 861,469. Particularly preferred are stearyl acid phosphate and lauryl acid phosphate which have been observed to effect the desirable controlled adhesion with excellent diaphragm action and glass retention when the laminate is broken. It has been found that when some laminates are prepared by the cast-in-place method, as generally described below, adhesion inhibitor is necessary as this method produces laminates in which the urethane is quite strongly adhered to the glass. Inhibitors are preferably added to the urethane reactants and are present in a concentration of about 0.05 to 0.12 percent by weight based on total formula weight. In certain instances, it is desirable to use an adhesion promotor and an adhesion inhibitor in combination. In this way, desirable low degree of adhesion to the polyurethane to glass is obtained but yet this low degree of adhesion can be maintained even under extremely high humidity conditions. Particularly desirable combinations are from 0.1 to 0.12 percent by weight stearyl acid phosphate plus 0.2 percent by weight gamma-glycidoxy propyltrimethoxy silane. Other desirable combinations of adhesion control additives are disclosed in U.S. Pat. No. 3,900,686 to Ammons which is incorporated herein by reference.

The preferred fully cured polycarbonate urethanes have inherent viscosities at 30° C. in 0.5 percent solution of silica stabilized chloroform or N-methyl-2-pyrrolidone of between about 0.60 and 1.40, preferably between about 1.0 to 1.3. Preferred polycarbonate urethanes of the invention can be characterized as plastomers, that is, they are elastoplastic and thus do not snap back as a true elastomer when stretched. In addition, they are clear, flexible and essentially non-adhesive at room temperature and generally have between about −20° and 50° C. a relatively constant Gehman modulus between of $10^7$ and $10^{9.5}$ log of 3 times the shear modulus in dynes per square centimeter as measured according to A.S.T.M. D-1053-65.

Preferred polycarbonate urethanes of the present invention will generally have an average molecular weight as estimated from inherent viscosity measurements between about 10,000 and 100,000 preferably between about 20,000 and 65,000. In addition, the optically clear urethanes upon heating will generally exhibit a low temperature endotherm at about 70° C. (differential thermal analysis can be made with a du Pont 900 thermal analyzer), and generally no endotherm or exotherm occurs between 100° and 170° C., indicating that the polymers are amorphous. Softening points of about 120°–160° C., melting points of about 160°–200° C., and decomposition temperatures of about 250°–290° C. are typical. Preferred compositions suitable for use in automobile windshields meet the standard requirements of minimum light transmission of 70 percent and preferably 86.5 percent or above (Illuminant A. Tungsten lamp 2,840° K) and less than 2 percent haze (ANSI Code Z-26.1, 1966, Test No. 18). The percent light transmission and percent haze can be measured by a Hunter Pivotable Sphere Haze Meter.

To fabricate safety glass laminates of the present invention, laminating can be conducted with a preformed polyurethane sheet or with the reactive ingredients. Laminating with a preformed plastic sheet is conducted in two stages, a first "prepressing" stage and a second "autoclaving" stage. The prepressing stage can be performed using rubber tubing edge channels as described in U.S. Pat. No. 2,948,645. In this method, a matching pair of thin glass sheets are assembled with the preformed polyurethane sheet therebetween to form a sandwich structure. The sheets of glass can be either annealed or tempered. To fabricate a bilayer laminate, the interior surface of one of the glass plates is coated with a release agent which will permit the polyurethane innerlayer material to release easily from the glass upon completion of the lamination. The release material must be able to withstand the temperatures and pressures of the subsequent laminating operation and should be substantially inert in relation to the plastic innerlayer material. Further, the release material should not induce any optical distortion at any time in the plastic innerlayer surface. Suitable release agents which meet the above requirements are, for example, polyvinyl fluoride, fluorinated ethylene-propylene copolymers and polytetrafluoroethylene, the latter being commercially available from E. I. duPont de Nemours and Company under the trademark TEFLON ®. After the sandwich structure has been assembled, the rubber tubing is fitted around the marginal edge of the sandwich and connected to a vacuum source. The prepressing operation is performed at a temperature of about 225° to 300° F. (about 107° to 149° C.) for about 10 to 15 minutes using a vacuum of about 26 to 28 inches of mercury. This prepressing operation removes all the air between the plies of glass, the plastic innerlayer material and the release material, thus permitting subsequent lamination to take place without the development of air bubbles at the glass-polyurethane surface. Another method of "prepressing" involves using modification of the so-called "vacuum bag technique" as generally described in U.S. Pat. No. 3,311,517. In this method, the sandwich construction is placed in a plastic bag, for example, a silicone rubber bag, which is inserted in an oven, With the exception of an air exhaust valve, the bag is then sealed to form an air-tight closure. The bag is evacuated through the air exhaust valve for about 5 minutes at a vacuum of about 26 to 28 inches of mercury. Temperature of the oven is then increased to about 300° F. (about 149° C.) and the temperature and vacuum held from 7 to 10 minutes to prepress the samples.

After all the air has been removed from the glass-plastic interface by prepressing, the prepressed glass-plastic-glass sandwiches are then passed into an oil autoclave or other suitable high pressure equipment and heated to a temperature of about 250° to 375° F. (about 121° to 191° C.) and at a pressure between 50 and 500 pounds per square inch for about 5 to 10 minutes to laminate the sandwich. The temperature of the oil is then reduced to about 150° F. (about 66° C.), the pressure is released and the sandwich sample removed from the autoclave.

The polyurethane can also be adhered to the glass casting it as a liquid prepolymer against the glass surface and curing the polyurethane in place against the glass. It has been found that when a glass-plastic bilayer is prepared in this manner, particularly strong bond is effected at the glass-plastic interface. The casting and curing-in-place technique essentially involves pouring or pumping uncured or partially cured resinous polyurethane material into a glass casting cell which consists of two spaced-apart glass sheets. If a motor vehicle windshield is to be fabricated, the glass sheets are bent and matched to one another. Glass bending matched pairs of glass sheets is well known in the art and can be done by the gravity-sagging technique as described in U.S. Pat. No. 3,248,196 and also by the "press bending" technique as described in U.S. Pat. No. 3,136,618. The matched pairs of bent glass sheets are held in a spaced-apart relationship by an adhesive-spacer element which is positioned between and around the perimeter of the glass sheets. A suitable spacer-adhesive element is, for example, a ¼ inch (6.25 millimeter) wide strip of 10 to 75 mil (0.25 to 1.9 millimeter) thick foam polyurethane tape which is commercially available from the Minnesota Mining Manufacturing Company. The thickness of the foam tape will determine the thickness of the plastic ply and thicker and thinner tapes are commercially available. The foam tape strip is continuous except where it is tightly butt-joined at the four corners of the windshield and except for about a 4 to 8 inch (about 100 to 200 millimeter) wide space near the center of one of the longer windshield edges which is devoid of foam tape to provide an opening for filing the casting cell with liquid resin. The foam polyurethane tape is an open cell foam and allows the air from the interior space of the cell to exit at any point along the edge while the cell is filling, but does not allow passage of any liquid resin.

One interior surface of the casting cell should be coated with a release agent so that after the resinous interlayer materials has been cast and cured in place, the glass sheet with the release surface can be easily separated from the cured interlayer material. For a bilayer windshield, this should be the concave interior surface. It should be noted that at this point instead of a glass back-up plate coated with a release agent, the casting cell could be made with a solid release material such as a smooth, metal element. However, because the casting and curing operation is conducted at elevated temperatures, it is desirous to construct both major walls of the casting cell with a material which has the same thermal coefficient of expansion so as to minimize chances of inducing any optical distortion into the plastic innerlayer. Also, because thickness uniformity of the innerlayer is particularly critical in windshield applications, it is desirous to construct the casting cell from two matched windshield elements which have been bent in matched fashion on a bending roll as described above. Thus, the glass back-up plate with a release material coated on it is preferred to a polished metal plate. The release material should, of course, be inert to the resinous innerlayer material and should be able to withstand temperature of casting and curing in place. Further, it should permit easy separation of the glass back-up plate from the cured innerlayer material inducing no resultant optical distortion. Suitable release agents for casting and curing in place include the fluorinated compounds mentioned above as release material for laminating preformed polycarbonate urethane sheet.

Casting may be accomplished by merely pouring the resin into the cell, but preferably casting is accomplished by pumping a metered quantity of liquid resin into the innerlayer space. After the resinous innerlayer has been cast, the windshield cell is sealed and the resin is permitted to cure in place. The time and temperature of cure will be from about 230° to 290° F. (about 110° to 143° C.) for a time of about 24 hours. If a catalyst is present in the polyurethane, the cure time can be significantly reduced to about 6 to 8 hours.

The safety glass laminates of this invention employing polycarbonate urethanes have excellent resistance to impact properties over a wide temperature range, and particularly at temperatures of 70° F. and above. For example, when a 0.030 to 0.035 inch (about 0.76 to 0.89 millimeter) thick polycarbonate urethane is laminated to a 7/32 inch (5.6 millimeter) thick 12 inch by 12 inch (0.3 meter square) float glass sheet to form a bilayer laminate and the laminate is held rigid and impacted on the urethane side with a 5-pound freely falling ball, the mean penetration velocity of the laminate at 120° F. (about 49° C.) will be at least 20 miles per hour. At 70° F. (about 21° C.), the mean penetration velocity will be about 30 miles per hour. The mean penetration velocity test is described in more detail in Example III.

The glass employed in the present invention can be of any type depending upon the intended use for the laminate but preferably is a clear, low colored, transparent type of glass such as the well-known silica type of glass, particularly soda-lime-silica glass. The nature and composition of various silica glasses is well known in the art and is described, for example, in the *Encyclopedia of Chemical Technology* by Kirk Othmer, published by Interscience Encyclopedia Inc., New York, New York, volume 7, pages 181–189. The glass can be strengthened by either thermal or chemical tempering.

For automobile and other vehicle windshields, the glass will preferably have a thickness of between about 0.065 inch and 0.250 inch (about 1.65 to 6.35 millimeter). Although the thickness of the innerlayer can vary between about 5 mils and 120 mils (about 0.13 and 3.05 millimeters) or more, it is preferably between about 15 and about 45 mils (about 0.38 and 1.14 millimeters) for automobile windshields in order to obtain maximum transparency, low haze, and good diaphragm action when ruptured.

The following examples will serve to illustrate the invention and preferred embodiments.

EXAMPLE I

A mixture which is 80 mole percent linear aliphatic and 20 mole percent cycloaliphatic is prepared by combining 12.80 moles of 1,6 hexanediol and 3.20 moles of 1,4 cyclohexanedimethanol. The mixture of diols is combined with 15 moles of diethyl carbonate. A catalyst solution of 10 percent by weight tetrabutyl titanate is prepared in 1,4 butanediol. Based on the total weight of diol and carbonate starting materials, 0.40 percent by weight of the catalyst solution is added to the reaction mixture, amounting to approximately 400 parts per million by weight catalyst.

The reaction mixture is refluxed under a nitrogen atmosphere while the temperature is maintained between about 130° and about 170° C. Ethyl alcohol is distilled from the mixture as the reaction proceeds. Near the end, the reaction mixture is subjected to a vacuum in order to drive the reaction to completion and strip off the last traces of ethyl alcohol.

The resultant polycarbonate diol has a hydroxyl number of 93.7 and a calculated molecular weight of 1197.

EXAMPLE II

A urethane polymer is prepared by reacting the polycarbonate diol of Example I with a cycloaliphatic diisocyanate and a monomeric aliphatic diol. A reaction vessel is charged with 1.00 mole of polycarbonate diol, 2.12 moles of 4,4'-methylene-bis-(cyclohexyl isocyanate), commercially available from du Pont as HYLENE W ®, and 1.12 moles of 1,4 butanediol. To each 100 parts by weight of the reaction mixture are added for adhesion control 0.04 parts by weight stearyl acid phosphate and 0.12 parts by weight gamma-glycidoxypropyltrimethoxysilane, commercially available from Dow Corning as Z-6040 silane.

The reaction is carried out at 290° F. (about 143° C.) for about 24 hours. The product is a completely transparent tough urethane polymer characterized by calculated urethane content of 13.5 percent, hard segment 21.27 percent, and cyclic segment 19.65 percent, and measured Shore A hardness of 95.

EXAMPLE III

The urethane polymer of Example II is cast as 0.030 to 0.035 inch (about 0.76 to 0.89 millimeter) film. The film is assembled between two 12 inch by 12 inch (0.3 meter square) glass plies, one of which is coated with a release agent on the surface contacting the film. The assembly is placed in a plastic bag which is evacuated and sealed and placed in an oil autoclave at 300° F. (about 149° C.) and 200 psi (about $1.38 \times 10^6$ Newtons per square meter) for about 45 minutes to effect lamination. The release ply is removed leaving a glass-polyurethane bilayer laminate. The laminate shows no "bloom" after 90 days.

Bilayer laminates prepared as above are held rigid in a frame and impacted from the film side with a 5 pound (2.27 kilogram) freely falling ball. From the height from which the ball is dropped, the velocity required to penetrate the laminate may be calculated. The penetration velocities for the glass-polyurethane bilayer laminates of the present example are greater than 24.5 miles per hour at 120° F. (about 49° C.) and 30 miles per hour at 70° F. (about 21° C.).

The above examples are offered to illustrate the invention and the preferred embodiments. It will be evident to persons skilled in the art that variations and modifications may be made without departing from the spirit of this invention, the scope of which is defined by the accompanying claims.

I claim:

1. A safety glass laminate comprising:
   a. a ply of glass; and
   b. bonded to said ply of glass a ply of transparent, energy absorbing polyurethane which is the reaction product of:
      (1) an organic diisocyanate:
      (2) an organic compound having two isocyanate-reactive hydrogens and a molecular weight less than about 250; and
      (3) a polycarbonate diol prepared from a mixture of linear aliphatic and cycloaliphatic diols wherein the aliphatic diol has at least 4 carbon atoms comprising (a) at least 30 mole percent linear aliphatic diol and (b) at least 10 mole percent cycloaliphatic diol.

2. A safety glass laminate as described in claim 1, wherein the ply of polyurethane is the reaction product of:
   a. a cycloaliphatic diisocyanate;
   b. a monomeric aliphatic diol; and
   c. a polycarbonate diol having a molecular weight between about 1000 and about 2000 and prepared from a mixture of 50 to 80 mole percent by weight linear aliphatic diol having at least 4 carbon atoms and 50 to 20 mole percent cycloaliphatic diol.

3. A nonblooming glass-polyurethane bilayer safety glass laminate as described in claim 2, wherein said ply of glass is between about 0.125 and about 0.250 inch thick and said layer of polyurethane is between about 0.015 and about 0.045 inch thick and is the reaction product of:
   a. 4,4'-methylene-bis-(cyclohexyl isocyanate);
   b. a monomeric aliphatic diol selected from the group consisting of 1,4 butanediol; 1,5 pentanediol; 1,6 hexanediol; and 1,4 cyclohexanedimethanol; and
   c. a polycarbonate diol prepared from a mixture of 70 to 80 mole percent 1,6 hexanediol and 30 to 20 mole percent 1,4 cyclohexanedimethanol by transesterification reaction with a dialkyl carbonate.

* * * * *